United States Patent
Krause et al.

(10) Patent No.: US 11,377,165 B2
(45) Date of Patent: Jul. 5, 2022

(54) BICYCLE SADDLE

(71) Applicant: Ergon International GmbH, Koblenz (DE)

(72) Inventors: Andreas Krause, Koblenz (DE); Franc Arnold, Koblenz (DE)

(73) Assignee: Ergon International GmbH, Koblenz (DE)

( * ) Notice: Subject to any disclaimer, the term of this patent is extended or adjusted under 35 U.S.C. 154(b) by 0 days.

(21) Appl. No.: 16/971,757

(22) PCT Filed: Jan. 24, 2019

(86) PCT No.: PCT/EP2019/051708
§ 371 (c)(1),
(2) Date: Aug. 21, 2020

(87) PCT Pub. No.: WO2019/162030
PCT Pub. Date: Aug. 29, 2019

(65) Prior Publication Data
US 2021/0031853 A1    Feb. 4, 2021

(30) Foreign Application Priority Data
Feb. 22, 2018  (DE) .................. 20 2018 000 943.1

(51) Int. Cl.
*B62J 1/26* (2006.01)
*B62J 1/08* (2006.01)

(52) U.S. Cl.
CPC ... *B62J 1/26* (2013.01); *B62J 1/08* (2013.01)

(58) Field of Classification Search
None
See application file for complete search history.

(56) References Cited

U.S. PATENT DOCUMENTS

| | | | |
|---|---|---|---|
| 5,203,607 A | 4/1993 | Landi | |
| 5,833,320 A * | 11/1998 | Kaneko | B60N 2/70 297/452.27 |
| 5,904,396 A * | 5/1999 | Yates | B62J 1/002 297/214 |
| 6,039,396 A * | 3/2000 | Muser | B62J 1/18 297/195.1 |
| 6,585,317 B1 * | 7/2003 | Atherley | B60N 2/24 180/219 |
| 9,630,540 B2 * | 4/2017 | Miyata | B60N 2/80 |
| 9,738,192 B2 * | 8/2017 | Hirata | B60N 2/3097 |
| 2002/0003364 A1 | 1/2002 | Minkow et al. | |
| 2007/0145795 A1 * | 6/2007 | Wyner | B62J 1/26 297/199 |
| 2011/0193376 A1 | 8/2011 | Cha | |

(Continued)

FOREIGN PATENT DOCUMENTS

| | | |
|---|---|---|
| CN | 2245020 Y | 1/1997 |
| DE | 9108143 U1 | 9/1991 |

(Continued)

*Primary Examiner* — David E Allred
(74) *Attorney, Agent, or Firm* — The Webb Law Firm

(57) ABSTRACT

A bicycle saddle includes a saddle shell. A saddle frame is arranged on a lower side of the saddle shell. A saddle cushion is arranged on the upper side of the saddle shell. The saddle cushion comprises at least two cushion elements. Further, a cover layer is provided whose edge region is arranged between the cushion elements in the region of a saddle edge.

12 Claims, 2 Drawing Sheets

(56) References Cited

U.S. PATENT DOCUMENTS

| | | | |
|---|---|---|---|
| 2013/0059115 A1* | 3/2013 | Lin | B32B 3/28 |
| | | | 428/138 |
| 2018/0200926 A1* | 7/2018 | Yu | B29C 44/086 |
| 2020/0255080 A1* | 8/2020 | Krause | B62J 1/08 |
| 2021/0053637 A1* | 2/2021 | Krause | B62J 1/002 |

FOREIGN PATENT DOCUMENTS

| | | |
|---|---|---|
| EP | 0692510 A1 | 1/1996 |
| EP | 1024992 A1 | 8/2000 |
| EP | 1174458 A1 | 1/2002 |
| EP | 1174459 A1 | 1/2002 |
| JP | S58152475 U | 10/1983 |
| JP | 2003127931 A | 5/2003 |
| WO | 0044821 A1 | 8/2000 |

\* cited by examiner

BICYCLE SADDLE

CROSS-REFERENCE TO RELATED APPLICATIONS

This application is the United States national phase of International Application No. PCT/EP2019/051708 filed Jan. 24, 2019, and claims priority to German Patent Application No. 20 2018 000 943.1 filed Feb. 22, 2018, the disclosures of which are hereby incorporated by reference in their entirety.

BACKGROUND OF THE INVENTION

Field of the Invention

The disclosure relates to a bicycle saddle.

Description of Related Art

Bicycle saddles comprise a saddle shell, on the lower side of which a saddle frame is usually arranged for connection to a saddle post. The upper side of the saddle shell is connected to a saddle cushion. Since the cushion is typically made from foamed material such as PU foam, it is necessary to span the saddle cushion with a cover layer. This is necessary in particular since the saddle cushion would otherwise absorb moisture and moreover, since the durability of the cushion material is low. The cover layer is typically a thin plastic material with a thickness of 0.5-1.5 mm. The cover layer spans the saddle cushion and is fixed, typically by adhesion, on the lower side of the saddle shell along the entire saddle edge. For manufacturing reasons, it is necessary to cut off the edge of the cover layer by hand.

It is an object of the disclosure to provide a bicycle saddle in which arranging the cover layer is facilitated.

The object is achieved according to this disclosure with a bicycle saddle.

SUMMARY OF THE INVENTION

The bicycle saddle of the present disclosure comprises a saddle shell, on the lower side of which a saddle frame or a corresponding connection between the saddle shell and the saddle post is provided. On the upper side of the saddle shell a saddle cushion is arranged. The saddle cushion is spanned by a cover layer. According to the disclosure, the saddle cushion comprises at least two cushion elements. The cushion elements can have different damping characteristics, different rebound characteristics, different hardness and the like. The cushion elements are arranged or configured such that they overlap each other at least partially. In particular, an overlap is provided at least in parts at the saddle edge. The saddle edge is the circumferential edge region of the saddle. By an overlap of two or more cushion elements in the region of the saddle edge, it is possible to arrange an edge region of the cover layer at the saddle edge between the two overlapping cushion elements. This has the advantage that the edge of the cover layer is not visible. As such, it is no longer necessary to make a clean cut edge or an end edge of the cover layer.

In a particularly preferred embodiment such an overlap of two cushion elements, between which the edge region of the cover layer is then arranged, is provided circumferentially along the entire saddle edge, so that the entire edge region of the cover layer or the edge of the cover layer is arranged between two cushion elements and is thus not visible. Possibly, however, only parts of the edge region of the cover layer may be arranged between tow cushion elements, while other parts of the cover layer are possibly fixed to the lower side of the saddle as usual. However, it is preferred that the entire edge region of the cover layer is arranged between cushion elements.

For realizing a fixation or retaining the cover layer as well as possible between the cushion elements it is preferred that one of the two cushion elements has a protrusion at the saddle edge which protrudes into a recess of the other cushion element. Thereby, it is possible to realize a better clamping or fixing of the edge portion of the cover layer.

It is preferred that the protrusion is provided at a lower cushion element, e.g. a cushion element directed towards the saddle shell, and on the upper side thereof that is directed away from the saddle shell. In the mounted state of the bicycle saddle, the protrusion is thus directed upwards. It is particularly preferred that this cushion element is connected to the saddle shell e.g. by adhesion or by means of heat or chemical reactions during the manufacturing process of the saddle.

It is further preferred that the protrusion is arranged such at the cushioning element that an outer side of the protrusion is visible. In particular, if the cushion element is the lower cushion element, the outer side of the protrusion is visible and is not covered by the cover layer. As such, the material of the in particular lower cushion element is visible and, in addition, has a design function. Thus, the protrusion corresponds to a raised edge of the corresponding cushion element.

It is further preferred that also the recess is open towards an outer side of the bicycle saddle. The recess thus corresponds to a step in the edge region of the cushion element.

In a particularly preferred embodiment, both the protrusion and the recess are provided along the entire circumference, e.g. along the entire saddle edge.

Further, it is particularly preferred that the cover layer rests on an upper side of the protrusion, in particular on the entire upper side of the protrusion, e.g. over the entire surface of the upper side. The upper side of the protrusion is the side of the protrusion directed towards the other cushion element having the recess. Thereby, it possible to realize a good fixation of the cover layer.

For a further improvement of the fixation of the cover layer, it is particularly preferred that the same also rests on a part of the inner side of the protrusion. Here, the inner side of the protrusion is the side of the protrusion directed towards the inside of the saddle. Thereby, the cover layer is bent twice so that the fixation is further improved.

The protrusion preferably has a width of 3 to 20 mm, in particular 5 to 10 mm. The width of the protrusion extends perpendicularly to the saddle edge towards the inside of the saddle.

In another preferred embodiment a lower cushion element is configured such that it covers the upper side of the saddle shell for at least 50%, in particular at least 70% and, as is particularly preferred, covers the same completely. Possibly, a further, e.g. a third or even a fourth cushion element may be provided to change the damping characteristics, rebound characteristics etc. of the saddle cushion. This may be advantageous in particular for the region of the sitbones, in the region of the saddle tip or other regions subjected to other particular loads. For example, gel elements or the like may be provided as further cushion elements.

In a further preferred embodiment, an upper cushion element is arranged and configured such that it covers the lower side of the saddle shell for at least 50%, in particular at least 70% and, as is particularly preferred, covers the same completely. It is also possible that the lower cushion element covers the upper side of the saddle shell only partially and that, in that case, the upper cushion element is configured such that it covers all of the upper side of the saddle shell in top plan view. In this respect, there may be regions in which the saddle cushion is multi-layered, as well as there may be regions in which the saddle cushion is only single-layered. At least in the single-layered regions it is preferred that the cover layer is fixed to the lower side of the saddle shell as usual.

In a particularly preferred embodiment, the in particular lower cushion element is configured as an elastomer body. In particular, the elastomer body comprises an open-cell or closed-cell foam and, as is particularly preferred, made of such foam.

In particular closed-cell foams are preferred. It is particularly preferred that in particular the lower cushion element comprises one or a plurality of particulate foams or is made in particular of one or a plurality of particulate foams. As a base material, E-TPU (expanded thermoplastic polyurethane), EPP (expanded polypropylene), EPS (expanded polystyrene), EPE (expanded polyethylene) or similar foams are particularly preferred. Generally, particulate foams are formed by small spheres of the expanded base material. These particles formed as spheres or other bodies are given their final shape in a tool, such as a mold or the like, using temperature and, possibly, water vapor. In particular, particulate foams have the advantage that they have a low density, a good heat/cold insulation and good damping characteristics.

It is particularly preferred that the lower cushion element or the main cushion element comprises E-TPU (expanded thermoplastic polyurethane) and, as is particularly preferred, is made from this material. The material manufactured by BASF under the product name "Infinergy" is particularly suited for this purpose. Methods for producing E-TPU are described e.g. in EP 692510, WO 00/44821, EP 11 74 459 and EP 11 74 458. It is further preferred that the cushion element is made of EVA (ethylene vinyl acetate) or that the main cushion element is made of a material that includes EVA. Further, materials that can be used are EPP (expanded polypropylene), TPE (thermoplastic elastomer) or E-TPE (expanded thermoplastic elastomer), EPS (expanded polystyrene) and EPE (expanded polyethylene). A combination of these materials or a combination of these materials with other materials is also possible, e.g. in a multi-layered structure. In particular, mixtures with co- or terpolymers can also be used. Thereby, different damping and movement features of the damper element can be obtained. Likewise, it is possible to provide a greater compaction of the corresponding materials in different regions, so that the damping and movement features can be influenced thereby.

Another well suited material for forming in particular the lower cushion element is a polyester-based PU-material. The material offered by BASF under the tradename "Elastopan" is particularly well suited. Preferably, the cushion element comprises such a material or is made from the same, wherein it is again possible to combine this material with other materials described.

It is particularly preferred that in particular the lower cushion element comprises one or a plurality of particulate foams or is made in particular of one or a plurality of particulate foams. As a base material, E-TPU (expanded thermoplastic polyurethane), EPP (expanded polypropylene), EPS (expanded polystyrene), EPE (expanded polyethylene) or similar foams are particularly preferred. Generally, particulate foams are formed by small spheres of the expanded base material. These particles formed as spheres or other bodies are given their final shape in a tool, such as a mold or the like, using temperature and, possibly, water vapor. In particular, particulate foams have the advantage that they have a low density, a good heat/cold insulation and good damping characteristics.

The lower cushion element is preferably made from moisture repellent material at least in the edge region.

In particular, in a sitting region of the saddle, the cushion element has a modulus of elasticity between 0.1 to 10 MPa, in particular 0.1 to 5 MPa, and particularly preferred 0.1 to 1.0 MPa. The particularly preferred material "Infinergy E-TPU" has a modulus of elasticity of 0.1 to 0.5 MPa.

Moreover, it is particularly preferred that in particular the lower cushion element has a low weight due to its low density. Specifically, the elastomeric body has a density of less than 1 $g/cm^3$, particularly preferred less than 0.5 $g/cm^3$ and in particular less than 0.2 $g/cm^3$. One of the particularly preferred materials, the material Elastil, has a density in the range of 0.05 to 0.2 $g/cm^3$.

The rebound behavior of in particular the lower cushion element is preferably in a range of more than 30%, in particular more than 40% and particularly preferred more than 50%.

The upper cushion element covers the lower cushion element at least partially, preferably completely. Specifically, the upper cushion element covers the lower cushion element for at least 50%, in particular at least 70% and, as is particularly preferred, completely.

The upper cushion element is preferably made of a foamable material, in particular foamed plastic material. A PU foam is particularly useful.

The saddle shell preferably comprises PP, PA6 or PA12 as its material or is made from these materials. According to the disclosure, the modulus of elasticity of the saddle shell is in a range from 1000 to 10000 MPa, preferably 2500 to 6000 MPa and particularly preferred in a range from 3000 to 5000 MPa. It is preferred to use PP (modulus of elasticity: 1100 to 1450 MPa), PP GF20 (modulus of elasticity: ca. 2900 MPa) and/or PA6 GF15 (modulus of elasticity: 4500 to 6500 MPa).

Moreover, the saddle shell may be made from TPU. TPU has the particular advantage that different moduli of elasticity can be achieved over a large range. The moduli of elasticity are in particular in a range from 500-6000 MPa.

Further, the saddle shell may also be made from a combination of the materials mentioned or also in combination with other materials.

The disclosure will be explained hereunder in detail with reference to a preferred embodiment and the accompanying drawings.

DESCRIPTION OF THE INVENTION

Figure 1:
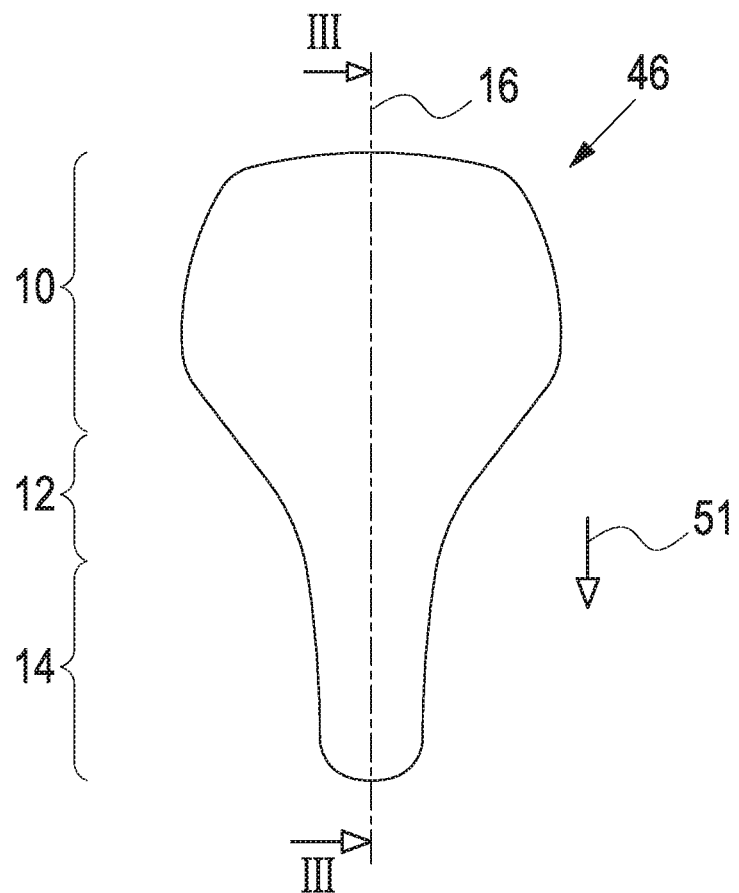
FIG. 1 shows a schematic top plan view on a bicycle saddle.

In top plan view (FIG. 1), a bicycle saddle comprises a sitting region 10 adjoined by a central region 12. The central region 12 passes into the saddle tip 14. Here, the saddle tip 14 is narrower in shape and the sitting region 10 is wider so that the greatest part of the weight of the bicycle is received in the sitting region in particular via the sitbones. The bicycle saddle is formed symmetric with respect to a central axis 16 that extends in the longitudinal direction 51.

Figure 2:
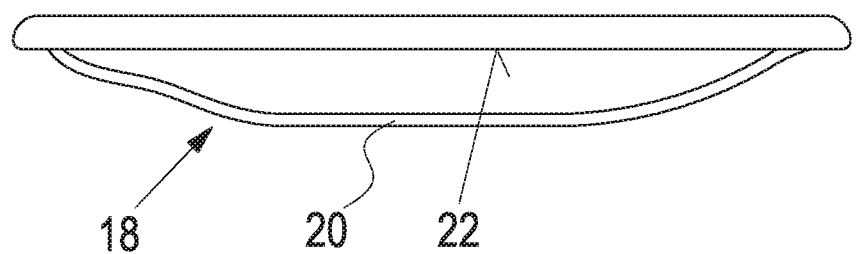
FIG. 2 is a schematic side view of the bicycle saddle shown in FIG. 1.

A lower side 22 of a bicycle saddle is connected to a saddle frame 18 (FIG. 2). The embodiment of the saddle frame 18 illustrated comprises in particular two stays extending essentially in the longitudinal direction of the saddle. In a central region 20 of the two stays of the saddle frame 18, the same can be connected to the saddle post via a fastening element. Of course, it is also possible to fasten the saddle to the saddle post in another way.

Figure 3:
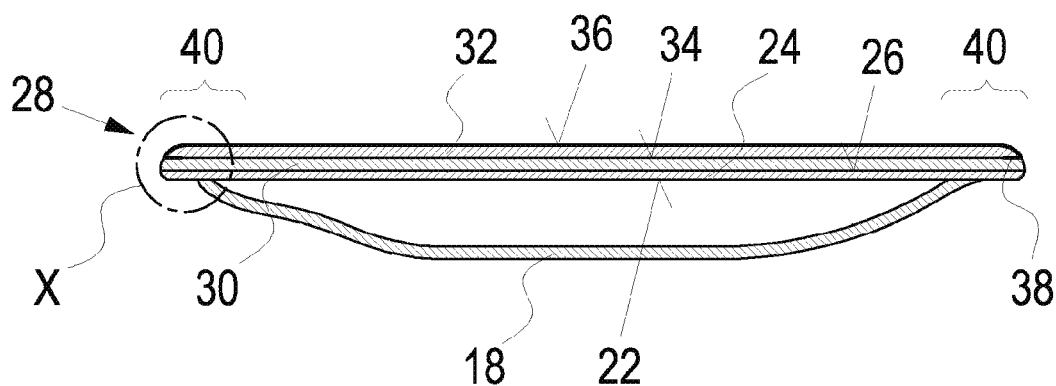
FIG. 3 is a schematic sectional view along the line III-III in FIG. 1.

The saddle of the disclosure comprises a saddle shell 24 made of a relatively rigid material, wherein the saddle frame 18 is connected to the lower side 12 thereof (FIG. 3). A saddle cushion 28 is arranged on an upper side 26 of the saddle shell 24. In the embodiment illustrated the saddle cushion 28 comprises a lower cushion element 30 as well as an upper cushion element 32. In the embodiment illustrated the lower cushion element 30 covers the entire upper side 26 of the saddle shell 24. Further, the upper cushion element 32 covers all of the surface of an upper side 34 of the lower cushion element 30.

Further, an upper side of the upper cushion element 32 is spanned with a cover layer 36. The edge region 38 of the cover layer 36 is arranged in the region of a saddle edge 40 between the two cushion elements 30, 32.

Figure 4:
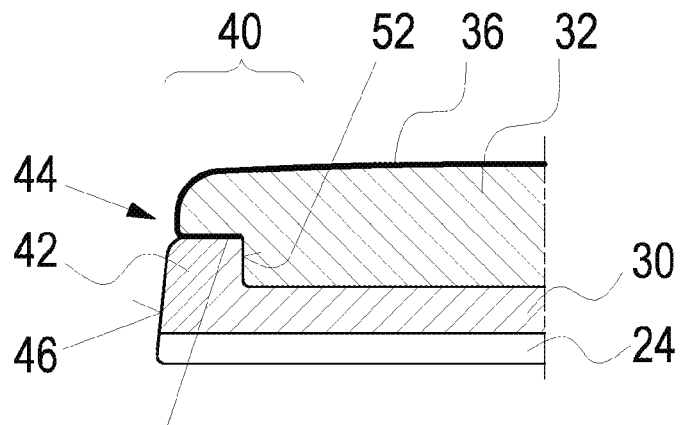
FIG. 4 shows a first preferred embodiment of the edge region of the bicycle saddle in an upscaled view X in FIG. 3
Figure 5:
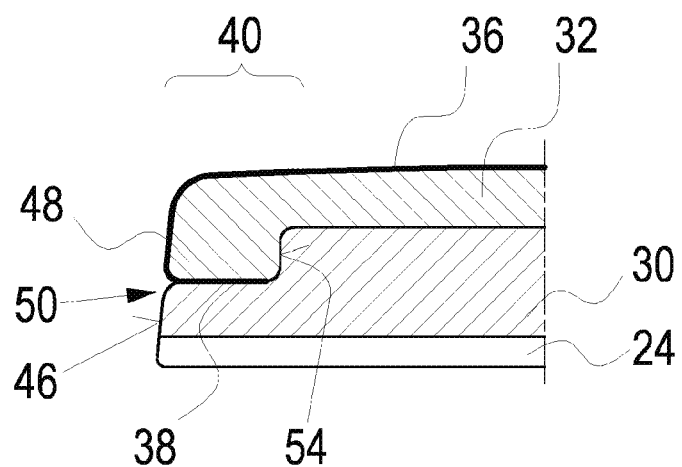
FIG. 5 shows a second preferred embodiment of the edge region of the bicycle saddle in an upscaled view X in FIG. 3.

Two different embodiments of this region are illustrated in an upscaled view X in FIGS. 4 and 5.

In the first preferred embodiment (FIG. 4), the lower cushion element 30 comprises a protrusion 42. With respect to the saddle shell 24, the protrusion extends upward or away from the same. The upper cushion element 32 correspondingly comprises a recess 44 formed complementarily to the protrusion 42. The cover layer 36 is guided around an outer side of the upper cushion element 32 oriented to the left in FIG. 4, the edge region 38 of the cover layer being arranged between the two cushion elements 30, 32 in the region of the protrusion 42 or the recess 44, respectively. An outer side 46 of the lower cushion element 32 is thus visible.

In the embodiment illustrated in FIG. 5, the design of the protrusion and of the recess are inverted with respect to the embodiment illustrated in FIG. 4. Correspondingly, the upper cushion element 32 comprises a protrusion 48 protruding into a correspondingly complementary form/recess 50 of the lower cushion element 30. The edge region 38 of the cover layer 36 is again arranged between the two cushion elements in the region of the saddle edge 40. An outer side 46, which in the embodiment illustrated in FIG. 5 has a lesser height than in the embodiment illustrated in FIG. 4, is again visible.

Preferably, a width of the protrusions 42, 48, as well as of the width 44, 50 in the region of the saddle edge according to the sectional view in FIGS. 4 and 5 is 3 to 20 mm, in particular 5 mm to 10 mm.

The edge region 38 of the cover layer 36 is preferably designed to extend circumferentially around the entire saddle edge and are substantially formed identically, so that the edge region 38 and the cover layer 36 is always arranged between the two cushion elements 30, 32.

On the one hand, the edge region 38 of the cover layer 36 can rest on the upper side of the corresponding protrusion 42, 48 and can possibly rest, in addition, on an inner side 52, 54 of the protrusion 42 and 48, respectively.

The invention claimed is:

1. A bicycle saddle comprising
a saddle shell,
a saddle frame arranged on a lower side of the saddle shell,
a saddle cushion arranged on an upper side of the saddle shell, and
a cover layer spanning the saddle cushion,
wherein the saddle cushion comprises at least an upper cushion element and a lower cushion element overlapping each other at least in parts of a saddle edge,
wherein at the saddle edge, where the upper and lower cushion elements overlap each other, an edge region of the cover layer extends over an outer surface of the upper cushion element and is arranged between the upper and lower cushion elements, and
wherein one of the upper and lower cushion elements comprises a protrusion at the saddle edge, wherein the protrusion protrudes into a recess of the other cushion element.

2. The bicycle saddle of claim 1, wherein the protrusion is provided on the lower cushion element that is directed towards the saddle shell, wherein the lower cushion element is connected to the upper side of the saddle shell.

3. The bicycle saddle of claim 1, wherein the protrusion comprises a visible outer side.

4. The bicycle saddle of claim 1, wherein the recess is open towards an outer side of the bicycle saddle.

5. The bicycle saddle of claim 1, wherein the protrusion extends in the circumferential direction of the saddle edge.

6. The bicycle saddle of claim 1, wherein the cover layer rests on an upper side of the protrusion.

7. The bicycle saddle of claim 6, wherein the cover layer rests on an inner side of the protrusion.

8. The bicycle saddle of claim 1, wherein the protrusion have a width of 3 to 20 mm.

9. The bicycle saddle of claim 1, wherein the lower cushion element covers all of the upper side of the saddle shell.

10. The bicycle saddle of claim 1, wherein the upper cushion element covers all of the lower cushion element.

11. The bicycle saddle of claim 1, wherein at least one of the upper and lower cushion elements comprises a particle foam.

12. The bicycle saddle of claim 1, wherein a material of the lower cushion element is moisture-repellent.

* * * * *